United States Patent
Chen et al.

(10) Patent No.: US 12,460,227 B2
(45) Date of Patent: Nov. 4, 2025

(54) SINGLE PLASMID VECTOR SYSTEM FOR PACKAGING RECOMBINANT HUMAN ADENOVIRUS TYPE 4 AND APPLICATION THEREOF

(71) Applicant: ACADEMY OF MILITARY MEDICAL SCIENCE, PLA, Beijing (CN)

(72) Inventors: Wei Chen, Beijing (CN); Busen Wang, Beijing (CN); Lihua Hou, Beijing (CN); Shipo Wu, Beijing (CN); Qiang Guo, Beijing (CN); Zhe Zhang, Beijing (CN); Zhenghao Zhao, Beijing (CN); Jinlong Zhang, Beijing (CN); Ling Fu, Beijing (CN); Xiaohong Song, Beijing (CN)

(73) Assignee: Academy of Military Medical Science, PLA, Beijing (CN)

( * ) Notice: Subject to any disclaimer, the term of this patent is extended or adjusted under 35 U.S.C. 154(b) by 957 days.

(21) Appl. No.: 17/629,592

(22) PCT Filed: Sep. 26, 2019

(86) PCT No.: PCT/CN2019/108318
§ 371 (c)(1),
(2) Date: Jan. 24, 2022

(87) PCT Pub. No.: WO2021/017138
PCT Pub. Date: Feb. 4, 2021

(65) Prior Publication Data
US 2022/0315949 A1   Oct. 6, 2022

(30) Foreign Application Priority Data
Jul. 27, 2019 (CN) .......................... 201910685065.7

(51) Int. Cl.
*C12N 15/86* (2006.01)
*C12N 7/00* (2006.01)

(52) U.S. Cl.
CPC .............. *C12N 15/86* (2013.01); *C12N 7/00* (2013.01); *C12N 2710/10321* (2013.01); *C12N 2710/10343* (2013.01); *C12N 2710/10352* (2013.01); *C12N 2710/10364* (2013.01)

(58) Field of Classification Search
None
See application file for complete search history.

(56) References Cited

U.S. PATENT DOCUMENTS

2013/0231267 A1   9/2013   O'Shea et al.
2014/0248305 A1   9/2014   Ertl et al.

FOREIGN PATENT DOCUMENTS

CN   102549152 A   7/2012
WO   2004037924 A1   5/2004

OTHER PUBLICATIONS

Weaver EA. Vaccines within vaccines: the use of adenovirus types 4 and 7 as influenza vaccine vectors. Hum Vaccin Immunother. 2014;10(3):544-56. doi: 10.4161/hv.27238. Epub Nov. 26, 2013. (Year: 2013).*
Rahman et al. Modulation of Adenovirus Packaging : A Novel Method Using Steric Hindrance. Molecular Therapy vol. 5, No. 5, May 2002, Part 2 of 2 Parts. (Year: 2002).*
Zhang Y, Liu R, Tian K, Wang Z, Yang X, Gao D, Zhang Y, Fu J, Wang H, Zhao J. Fiber2 and hexon genes are closely associated with the virulence of the emerging and highly pathogenic fowl adenovirus 4. Emerg Microbes Infect. Dec. 5, 2018;7(1):199. (Year: 2018).*
Weaver, "Vaccines within vaccines: the use of adenovirus types 4 and 7 as influenza vaccine vectors," Human Vaccines & Immunotherapeutics (2014); 10(3): 544-556.
Mei et al., "Complete replication-competent adenovirus 11p vectors with E1 or E3 insertions show improved heat stability," Virology (2016); 497: 198-210.
Suzuki et al., "Preferable sites and orientations of transgene inserted in the adenovirus vector genome: The E3 site may be unfavorable for transgene position," Gene Therapy (2015); 22: 421-429.
Liu et al., "Application of Adenovirus as Vaccine Vectors," Letters in Biotechnology (2011); 22(4): 552-558.

* cited by examiner

*Primary Examiner* — Nicole Kinsey White
*Assistant Examiner* — Ruixue Wang
(74) *Attorney, Agent, or Firm* — Fox Rothschild LLP

(57) ABSTRACT

A single plasmid vector system for packaging recombinant human adenovirus type 4. The vector system contains an E3 region-deleted human adenovirus type 4 (HAdV-4 or Ad4) genome, a vector sequence for amplifying plasmids in bacteria, a pBR322 replication origin, a kanamycin resistance gene, and a replication control sequence; and an exogenous gene embedding site is located behind a packaging signal of the human adenovirus type 4 and in front of an E1 region. The present invention further provides a method for packaging the recombinant human adenovirus type 4 by the single plasmid vector system and an application in vaccine and drug preparation. The vector system can be used for rapidly and efficiently preparing a human adenovirus type 4 vector recombinant virus for stably expressing an exogenous gene, and has a good application prospect in the fields of preparation of a diagnostic kit, a vaccine, a gene therapy kit and/or a tumor therapy drug, etc.

8 Claims, 7 Drawing Sheets

Specification includes a Sequence Listing.

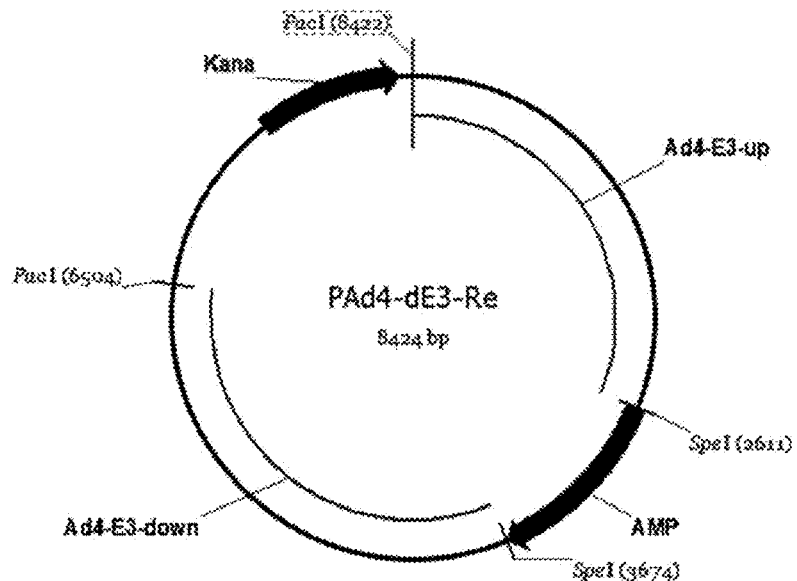
FIG. 3
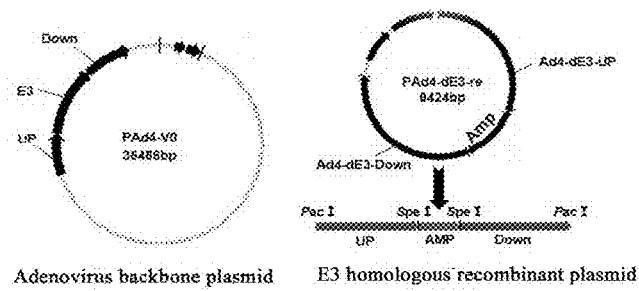
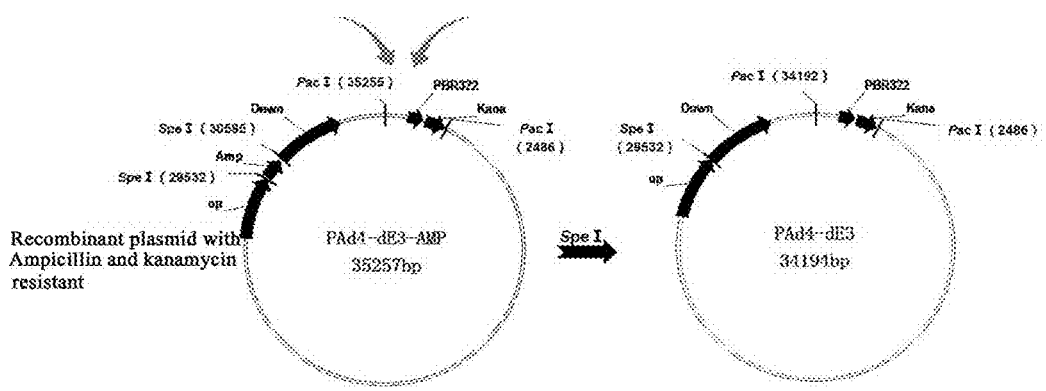
FIG. 4

FIG. 9A, FIG. 9B, and FIG. 9C

SEQUENCE LISTING

<160> NUMBER OF SEQ ID NOS: 29

<210> SEQ ID NO 1

```
<211> LENGTH: 475
<212> TYPE: DNA
<213> ORGANISM: Artificial
<220> FEATURE:
<223> OTHER INFORMATION: Synthetic

<400> SEQUENCE: 1
ctatctatat aatataccct atttttttg tgtgagttaa tatgcaaata aggcgtgaaa      60
atttggggat ggggcgcgct gattggctgt gacagcggcg ttcgttaggg gcggggcagg    120
tgacgttttg atgacgcgac tatgaggagg agttagtttg caagttctgg tggggaaaag   180
tgacgtcaaa cgaggtgtgg tttgaacacg gaaatactca attttcccac gctgtctaac   240
aggaaatgag gtgttttttgg gcggatgcaa gtgaaaacgg accattttcg cgcgaaaact  300
gaatgaggaa gtgaaatctg agtaatttag tgtttatgac agggaggagt atttgccgag   360
ggccgagtag actttgaccg tttacgtggg ggtttcgatt accgtgtttt tcacctaaag   420
ttccgcgtac ggtgtcaaag tccggtgttt aaacttacgt aggtgtcagc tgatc         475

<210> SEQ ID NO 2
<211> LENGTH: 766
<212> TYPE: DNA
<213> ORGANISM: Artificial
<220> FEATURE:
<223> OTHER INFORMATION: Synthetic

<400> SEQUENCE: 2
gtttaaacgt tccgggtcaa agttggcgtt ttattattat agtcagctct agagatatac     60
tgagtcatta gggactttcc aatgggtttt gcccagtaca taaggtcaat aggggtgaat   120
caacaggaaa gtcccattgg agccaagtac actgagtcaa tagggacttt ccattgggtt   180
ttgcccagta caaaaggtca ataggggtg agtcaatggg ttttccccat tattggcacg   240
tacataaggt caataggggt gagtcattgg gttttccag ccatttagtt aaaacgccat   300
gtactttccc accattgacg tcaatgggct attgaaacta atgcaacgtg acctttaaac   360
ggtactttcc catagctgat taatgggaaa gtaccgttct cgagccaata cacgtcaatg   420
ggaagtgaaa gggcagccaa aacgtaacac cgccccggtt tccctggaa aattccatat    480 tggcacgcat tctattggct gagctgcgtt ctacgtgggt ataagaggcg cgaccagcgt   540
cggtaccgtc gcagtcttcg gtctgaccac cgtagaacgc agatcattta aatcgacttc   600
gagcaacttg tttattgcag cttataatgg ttacaaataa agcaatagca tcacaaattt   660
cacaaataaa gcattttttt cactgcattc tagttgtggt ttgtccaaac tcatcaatgt   720
atcttatcat gtctggatcg tctagcatcg aagatccagt ttaaac                   766

<210> SEQ ID NO 3
<211> LENGTH: 766
<212> TYPE: DNA
<213> ORGANISM: Artificial
<220> FEATURE:
<223> OTHER INFORMATION: Synthetic

<400> SEQUENCE: 3
gtttaaactg gatcttcgat gctagacgat ccagacatga taagatacat tgatgagttt     60
ggacaaacca caactagaat gcagtgaaaa aaatgcttta tttgtgaaat tgtgatgct    120 attgctttat ttgtaaccat tataagctgc aataaacaag ttgctcgaag tcgatttaaa   180
tgatctgcgt tctacggtgg tcagaccgaa gactgcgacg gtaccgacgc tggtcgcgcc   240
tcttataccc acgtagaacg cagctcagcc aatagaatgc gtgccaatat ggaatttcca   300
```

```
ggggaaaacc ggggcggtgt tacgttttgg ctgcccttcc acttcccatt gacgtgtatt    360
ggctcgagaa cggtactttc ccattaatca gctatgggaa agtaccgttt aaaggtcacg    420
ttgcattagt ttcaatagcc cattgacgtc aatggtggga agtacatgg cgttttaact     480 aaatggctgg aaaaacccaa tgactcaccc ctattgacct tatgtacgtg ccaataatgg    540
gaaaaaccca ttgactcacc ccctattgac cttttgtact gggcaaaacc caatggaaag    600
tccctattga ctcagtgtac ttggctccaa tgggactttc ctgttgattc accctattg     660 accttatgta ctgggcaaaa cccattggaa agtccctaat gactcagtat atctctagag    720
ctgactataa aataaaacg ccaactttga cccggaacgt ttaaac                    766
```

<210> SEQ ID NO 4
<211> LENGTH: 41
<212> TYPE: DNA
<213> ORGANISM: Artificial
<220> FEATURE:
<223> OTHER INFORMATION: Synthetic

<400> SEQUENCE: 4

```
ggaacataat ggtgcttaat taactatcta tataatatac c                         41
```

<210> SEQ ID NO 5
<211> LENGTH: 24
<212> TYPE: DNA
<213> ORGANISM: Artificial
<220> FEATURE:
<223> OTHER INFORMATION: Synthetic

<400> SEQUENCE: 5

```
catatggtca gataagggct gaat                                            24
```

<210> SEQ ID NO 6
<211> LENGTH: 34
<212> TYPE: DNA
<213> ORGANISM: Artificial
<220> FEATURE:
<223> OTHER INFORMATION: Synthetic

<400> SEQUENCE: 6

```
ttatctgacc atatgactcc atacaccaat gctg                                 34
```

<210> SEQ ID NO 7
<211> LENGTH: 33
<212> TYPE: DNA
<213> ORGANISM: Artificial
<220> FEATURE:
<223> OTHER INFORMATION: Synthetic

<400> SEQUENCE: 7

```
gcgcacatta attaactatc tatataatat acc                                  33
```

<210> SEQ ID NO 8
<211> LENGTH: 30
<212> TYPE: DNA
<213> ORGANISM: Artificial
<220> FEATURE:
<223> OTHER INFORMATION: Synthetic

<400> SEQUENCE: 8

```
ttaattaagc accattatgt tccggatctg                                      30
```

<210> SEQ ID NO 9

```
<211> LENGTH: 27
<212> TYPE: DNA
<213> ORGANISM: Artificial
<220> FEATURE:
<223> OTHER INFORMATION: Synthetic

<400> SEQUENCE: 9
ttaattaatg tgcgcggaac ccctatt                                          27

<210> SEQ ID NO 10
<211> LENGTH: 37
<212> TYPE: DNA
<213> ORGANISM: Artificial
<220> FEATURE:
<223> OTHER INFORMATION: Synthetic

<400> SEQUENCE: 10
gcgcacatta attaatgcac tacatcttca ggcacgg                               37

<210> SEQ ID NO 11
<211> LENGTH: 28
<212> TYPE: DNA
<213> ORGANISM: Artificial
<220> FEATURE:
<223> OTHER INFORMATION: Synthetic

<400> SEQUENCE: 11
actagttgtc gaagccgagc taggtcag                                         28

<210> SEQ ID NO 12
<211> LENGTH: 25
<212> TYPE: DNA
<213> ORGANISM: Artificial
<220> FEATURE:
<223> OTHER INFORMATION: Synthetic

<400> SEQUENCE: 12
actagttcaa gaccctatgc ggcct                                            25

<210> SEQ ID NO 13
<211> LENGTH: 34
<212> TYPE: DNA
<213> ORGANISM: Artificial
<220> FEATURE:
<223> OTHER INFORMATION: Synthetic

<400> SEQUENCE: 13
cgtgacttta attaacggaa acagctccat catg                                  34

<210> SEQ ID NO 14
<211> LENGTH: 33
<212> TYPE: DNA
<213> ORGANISM: Artificial
<220> FEATURE:
<223> OTHER INFORMATION: Synthetic

<400> SEQUENCE: 14
gcttcgacaa ctagtggatc ttcacctaga tcc                                   33

<210> SEQ ID NO 15
<211> LENGTH: 32
<212> TYPE: DNA
<213> ORGANISM: Artificial
<220> FEATURE:
<223> OTHER INFORMATION: Synthetic

<400> SEQUENCE: 15
```
gggtcttgaa ctagtggaaa tgtgcgcgga ac                                    32

<210> SEQ ID NO 16
<211> LENGTH: 28
<212> TYPE: DNA
<213> ORGANISM: Artificial
<220> FEATURE:
<223> OTHER INFORMATION: Synthetic

<400> SEQUENCE: 16
ttaattaaag tcacgtagcg atagcgga                                         28

<210> SEQ ID NO 17
<211> LENGTH: 27
<212> TYPE: DNA
<213> ORGANISM: Artificial
<220> FEATURE:
<223> OTHER INFORMATION: Synthetic

<400> SEQUENCE: 17
ttaattaatg tgcgcggaac ccctatt                                          27

<210> SEQ ID NO 18
<211> LENGTH: 16
<212> TYPE: DNA
<213> ORGANISM: Artificial
<220> FEATURE:
<223> OTHER INFORMATION: Synthetic

<400> SEQUENCE: 18
aacgaggtgt ggtttg                                                      16

<210> SEQ ID NO 19
<211> LENGTH: 43
<212> TYPE: DNA
<213> ORGANISM: Artificial
<220> FEATURE:
<223> OTHER INFORMATION: Synthetic

<400> SEQUENCE: 19
cagctgacac ctacgtaagt ttaaacaccg gactttgaca ccg                        43

<210> SEQ ID NO 20
<211> LENGTH: 43
<212> TYPE: DNA
<213> ORGANISM: Artificial
<220> FEATURE:
<223> OTHER INFORMATION: Synthetic

<400> SEQUENCE: 20
cggtgtcaaa gtccggtgtt taaacttacg taggtgtcag ctg                        43

<210> SEQ ID NO 21
<211> LENGTH: 21
<212> TYPE: DNA
<213> ORGANISM: Artificial
<220> FEATURE:
<223> OTHER INFORMATION: Synthetic

<400> SEQUENCE: 21
acggcggcca gcatatgact g                                                21

<210> SEQ ID NO 22
<211> LENGTH: 15
<212> TYPE: DNA

```
<213> ORGANISM: Artificial
<220> FEATURE:
<223> OTHER INFORMATION: Synthetic

<400> SEQUENCE: 22
caaagtccgg tgttt                                                    15

<210> SEQ ID NO 23
<211> LENGTH: 15
<212> TYPE: DNA
<213> ORGANISM: Artificial
<220> FEATURE:
<223> OTHER INFORMATION: Synthetic

<400> SEQUENCE: 23
cacctacgta agttt                                                    15

<210> SEQ ID NO 24
<211> LENGTH: 37
<212> TYPE: DNA
<213> ORGANISM: Artificial
<220> FEATURE:
<223> OTHER INFORMATION: Synthetic

<400> SEQUENCE: 24
caaagtccgg tgtttaaacg ttccgggtca aagttgg                            37

<210> SEQ ID NO 25
<211> LENGTH: 39
<212> TYPE: DNA
<213> ORGANISM: Artificial
<220> FEATURE:
<223> OTHER INFORMATION: Synthetic

<400> SEQUENCE: 25
cacctacgta agtttaaact ggatcttcga tgctagacg                          39

<210> SEQ ID NO 26
<211> LENGTH: 39
<212> TYPE: DNA
<213> ORGANISM: Artificial
<220> FEATURE:
<223> OTHER INFORMATION: Synthetic

<400> SEQUENCE: 26
caaagtccgg tgtttaaact ggatcttcga tgctagacg                          39

<210> SEQ ID NO 27
<211> LENGTH: 37
<212> TYPE: DNA
<213> ORGANISM: Artificial
<220> FEATURE:
<223> OTHER INFORMATION: Synthetic

<400> SEQUENCE: 27
cacctacgta agtttaaacg ttccgggtca aagttgg                            37

<210> SEQ ID NO 28
<211> LENGTH: 15
<212> TYPE: DNA
<213> ORGANISM: Artificial
<220> FEATURE:
<223> OTHER INFORMATION: Synthetic

<400> SEQUENCE: 28
tgagctcgtc gattt                                                    15
```

```
<210> SEQ ID NO 29
<211> LENGTH: 15
<212> TYPE: DNA
<213> ORGANISM: Artificial
<220> FEATURE:
<223> OTHER INFORMATION: Synthetic

<400> SEQUENCE: 29
gctcgaagtc gattt                                                15
```

SINGLE PLASMID VECTOR SYSTEM FOR PACKAGING RECOMBINANT HUMAN ADENOVIRUS TYPE 4 AND APPLICATION THEREOF

CROSS REFERENCE TO RELATED APPLICATIONS

This application is a U.S. national phase of International Patent Application No. PCT/CN2019/108318, filed on Sep. 26, 2019, which claims priority to Chinese Patent Application No. 201910685065.7 filed on Jul. 27, 2019. The contents of the applications are incorporated herein by reference in their entireties.

REFERENCE TO A SEQUENCE LISTING

This application incorporates by reference the Sequence Listing submitted in Computer Readable Form as file Seq-Listing_176495-00600_ST25, created on May 27, 2022 and containing 7,858 bytes.

TECHNICAL FIELD

The present invention belongs to the field of bioengineering technology. Specifically, the present invention relates to a recombinant human adenovirus type 4 vector system (Ad4Fast) and its application.

BACKGROUND TECHNOLOGY

Adenovirus has a non-enveloped, icosahedral symmetrical structure, with a diameter of 70-90 nm, whose genome is single chain double-stranded DNA, about 36 kb in length, with an inverted terminal repeat (ITR) at each end of the genome, and the inner side of the upstream terminal repeat containing a packaging signal to control the packaging of the recombinant virus. After the genome enters the nucleus, the adenovirus will initiate orderly and complex step-by-step magnification of the transcription and shearing process. Based on the time order of transcription, the genome coding region can be divided into early transcription regions (E1-E4) and late transcription regions (L1-L5). E1 region is an important protein that regulates cell metabolism and activates early gene expression, and deletion of E1 will lead to the virus losing replication ability. The function of E3 region is mainly related to the virus escaping from the immunologic surveillance of host cell, and deletion of E3 will not block the replication and assembly of the virus.

SUMMARY OF THE INVENTION

Technical Problem

Currently, the replication-deficient adenovirus type 5 vector system is widely used in fields including vaccine research and development, gene therapy, and tumor treatment. However, the pre-existing immunity to adenovirus type 5 is maintained at a high level worldwide, with the positive rate of serum neutralizing antibody being over 70% in China. The so-called pre-existing immunity refers to the body's existing immune response against the virus used as the vector before the vaccine immunization, which is often caused by the infection of wild-type virus used as the vector, and the level of serum neutralizing antibody against the virus used as the vector can measure the level of pre-existing immunity. In the studies of human adenovirus-vectored vaccine, the high level of pre-existing immunity to adenovirus type 5 significantly affected the antigen-specific humoral and cellular immune response induced by adenovirus type 5 vectored vaccine. The pre-existing immunity level of adenovirus type 4 is significantly lower than that of adenovirus type 5, which has high safety when used as an oral vaccine for the prevention of acute respiratory diseases caused by adenovirus infection for a long time. Therefore, the adenovirus type 4 vector has high application value. The purpose of the present invention is to provide a vector system capable of overcoming the current technical defects, and stably, efficiently and quickly packaging the recombinant human adenovirus type 4.

Solution to Technical Problem

For the above purposes, the present invention firstly provides a replication-competent human adenovirus type 4 vector single-plasmid system. The vector system contains E3-deleted human adenovirus type 4 genome, and the site for exogenous gene insertion is located behind the packaging signal of the human adenovirus type 4 and prior to E1 region.

The single-plasmid system herein may also contain the vector sequence, pBR322 replication origin, kanamycin resistance gene and replication control sequence for plasmid amplification in a bacterium. These functional components are conventional technologies in the field and do not constitute the core content of the present invention.

In a preferred embodiment, the human adenovirus type 4 genome and the vector sequence in the vector system are connected by two PacI restriction enzyme sites, and the insertion of an exogenous gene depends on the restriction enzyme site PmeI.

More preferably, the nucleotide sequence prior to E1 region of human adenovirus type 4 in the vector system is shown as SEQ ID NO.1.

The exogenous gene expression cassette or the exogenous gene can be inserted into the clone site of the adenovirus backbone plasmid provided by the present invention in vitro, and the recombinant virus can be directly packaged. The backbone plasmid contains three forms, namely: Vector plasmid PAd4-dE3-E1 for inserting exogenous gene expression cassettes, Vector plasmid PAd4-dE3-E1RC for inserting exogenous gene in forward orientation, and Vector plasmid PAd4-dE3-E1LC for inserting exogenous gene in reverse orientation.

In a more preferred embodiment, the vector system does not contain expression control elements at the site for exogenous gene insertion, and the DNA fragment carrying the exogenous gene expression cassette is directly cloned into the restriction enzyme site PmeI in the vector system. The vector system is defined as PAd4-dE3-E1.

The vector plasmid PAd4-dE3-E1 is designed and constructed by the present inventor (see Example 1 and FIGS. 1-6), which is used to insert the complete exogenous gene expression cassette, and the promoter and termination sequence can be freely selected. The said plasmid contains E3-completely-deleted human adenovirus type 4 genome, pBR322 replication origin, kanamycin resistance gene and replication control sequence (repression of primer, ROP). The present inventor uses the upper and downstream terminal sequences of the virus as homology arms to prepare the homologous recombinant plasmid, which can be homologously recombined with wild-type human adenovirus type 4 genome in BJ5183 bacterium to obtain the plasmid PAd4-V0 containing the full-length adenovirus genome. The upper and downstream sequences of E3 region in the virus genome are used as the homology arms, to prepare homologous recombinant plasmid, which is homologously recombined with plasmid PAd4-V0 in BJ5183 bacterium to obtain the E3-deleted adenovirus backbone plasmid PAd4-dE3. In the plasmid PAd4-dE3, a single enzyme cutting site PmeI is introduced behind the packaging sequence of adenovirus genome but prior to E1 region (corresponding to the bases 397-471 bp in adenovirus genome), and then vector plasmid PAd4-dE3-E1 that can be used for the insertion of exogenous gene expression cassette is obtained.

In another preferred embodiment, a control element for the expression of exogenous gene is inserted in forward orientation at the site for the exogenous gene insertion in the vector system. The said control element is a DNA fragment containing mCMV promoter and SV40 polyadenylic acid tail termination sequence. The vector system is defined as PAd4-dE3-E1RC.

More preferably, both ends of the control element are PmeI sites, the site for exogenous gene clone in the control element is SwaI, and DNA fragment of the exogenous gene is directly cloned into the restriction enzyme site SwaI in the vector system. The vector system is named PAd4-dE3-E1RC.

The vector plasmid PAd4-dE3-E1RC is designed and constructed by the present inventor (see Example 2 and FIG. 7), which is used for the insertion of exogenous gene in forward orientation. On the basis of vector plasmid PAd4-dE3-E1, mCMV promoter for initiating exogenous gene expression and SV40 polyA sequence for controlling the termination of expression are introduced at PmeI site. The mCMV promoter and SV40 polyA sequence are inserted in forward orientation (mCMV promoter at the upstream of the adenovirus genome, while SV40 polyA sequence at the downstream), with the restriction enzyme site SwaI for the insertion of exogenous gene between the mCMV promoter and SV40 polyA.

In another preferred embodiment, a control element for the expression of exogenous gene is inserted in reverse orientation at the site for exogenous gene insertion site in the vector system. The said control element is a DNA fragment containing mCMV promoter and SV40 polyadenylic acid tail termination sequence.

More preferably, both ends of the control element are PmeI sites, the site for the exogenous gene clone in the control element is SwaI, and DNA fragment of the exogenous gene is directly cloned into the restriction enzyme site SwaI in the PAd4-dE3-E1RC vector system. The vector system is defined as PAd4-dE3-E1LC.

The vector plasmid PAd4-dE3-E1LC is designed and constructed by the present inventor (see Example 2 and FIG. 8), which is used for the insertion of exogenous gene in reverse orientation. On the basis of vector plasmid PAd4-dE3-E1, mCMV promoter for controlling the initiation of exogenous gene expression and SV40 polyA sequence for controlling the termination of expression are introduced at PmeI site. The mCMV promoter and SV40 polyA sequence are inserted in reverse orientation (mCMV promoter at the downstream of the adenovirus genome, while SV40 polyA sequence at the upstream), with restriction enzyme cutting site SwaI for the insertion of exogenous gene between the mCMV promoter and SV40 polyA.

Secondly, the present invention also provides a method for packaging recombinant human adenovirus type 4 using the single-plasmid vector system, and the method comprises the following steps:

(1) Linearizing human adenovirus type 4 vector recombinant plasmid by restriction enzyme PacI;
(2) Transfecting the linearized fragment into HEK293 cells, then culturing the transfected cells until the occurrence of cytopathic changes;
(3) Freezing and thawing the cytopathic cell culture fluid, then Continuously passage culturing until persistent cytopathic changes;
(4) Harvesting stably passaged recombinant human adenovirus type 4.

BRIEF DESCRIPTION OF THE DRAWINGS

FIG. 3 depicts the schematic diagram of the E3 homologous recombinant plasmid of human adenovirus type 4. The upstream and downstream sequences of E3 region of about 3000 bp in length are amplified according to the template of Human adenovirus type 4 genome as the upstream homology arm (Ad4-E3-up) and downstream homology arm (Ad4-E3-down) respectively. The vector region sequence containing kanamycin resistance gene (Kana) and the replicon is amplified according to the template of pET28a. The ampicillin resistance gene (AMP) is amplified according to the template of plasmid pMD-18T. The above fragments are spliced in the sequence of "E3 upstream homology arm-ampicillin resistance gene-E3 right homology arm", and the spliced fragments are transferred into the cloning vector containing kanamycin resistance gene. Restriction enzyme site SpeI is introduced into the location where the homology arm intersects with the ampicillin resistance gene, and restriction enzyme site PacI is introduced into the position where the homology arm intersects the vector region, to prepare the E3 region homologous recombinant plasmid, which is used to completely knockout E3 region of the human adenovirus type 4 vector.

FIG. 4 shows the schematic diagram of the construction of E3-deleted human adenovirus type 4 backbone plasmid. The adenovirus backbone plasmid PAd4-V0 is transformed into bacterium BJ5183, and the bacterium is later prepared into competent bacterium. The E3 region homologous recombinant plasmid PAd4-dE3-Re is linearized by PacI.

Then the linearized fragment is transformed into competent bacterium containing adenovirus backbone plasmid PAd4-V0. In the linearized E3 region homologous recombinant plasmid, the upstream and downstream of ampicillin resistance gene are respectively the upstream and downstream sequences of E3 region of the adenovirus genome. After the fragment is homologously recombined with the upstream and downstream sequences of E3 region of backbone plasmid PAd4-V0, E3 region of the adenovirus backbone plasmid is replaced by ampicillin resistance gene, and the recombinant transformant obtains ampicillin resistance. Ampicillin antibiotic is used to screen the target transformant PAd4-dE3-AMP that meets the requirements. The restriction endonuclease SpeI is then used to delete ampicillin resistance gene. After the digested fragment is recovered, T4 DNA ligase is added to make the fragments self-ligated. Subsequently, the self-ligated fragment is transformed into TOP 10 competent bacterium. Kanamycin is used to screen the E3-deleted human adenovirus type 4 backbone plasmid PAd4-dE3.

Figures 5, 6:
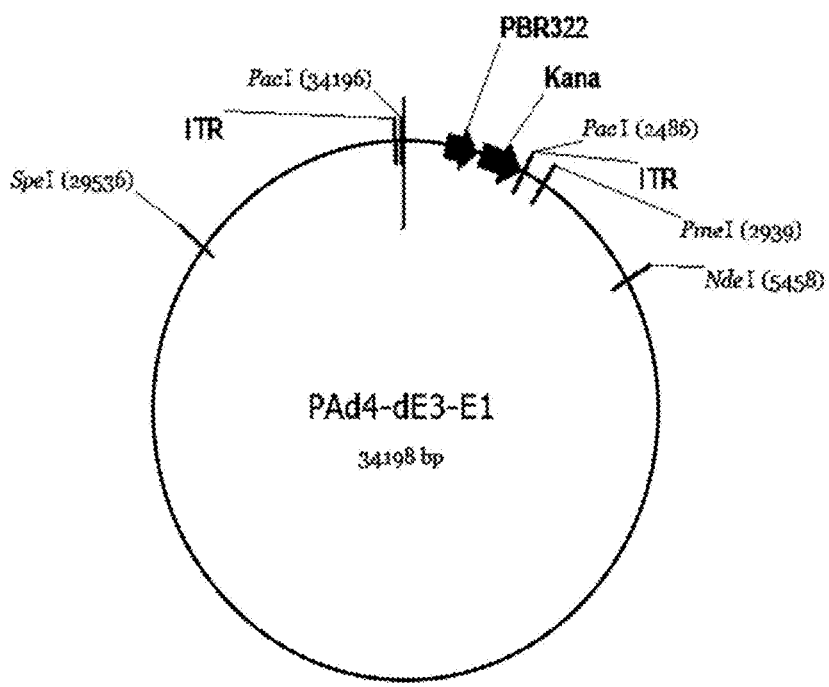

FIG. 5 is the schematic diagram of the construction of human adenovirus type 4 backbone plasmid PAd4-dE3-E1. The adenovirus backbone plasmid PAd4-dE3 is digested with PmeI (2692 bp, single restriction site) and NdeI (5454 bp, single restriction site), then overlapping PCR is used to amplify the complementary fragment. The base A at 2692 bp is mutated to base G, and the original PmeI site is deleted. Base AAAC is added at 2939 bp of the spare sequence between the packaging signal and E1 region to introduce restriction site PmeI, and the newly introduced restriction site PmeI is the cloning site for the insertion of exogenous gene expression cassette. Gibson in vitro one-step recombination method (NEB) is used to splice the PCR-amplified complementary fragment with the double-digested backbone plasmid PAd4-dE3, then the spliced product is transformed into TOP10 competent cells. The positive transformant is selected as the backbone plasmid PAd4-dE3-E1, which can be used for the insertion of the antigen expression cassette in E1 region.

FIG. 6 provides the schematic diagram of human adenovirus type 4 backbone plasmid PAd4-dE3-E1. PmeI is used to linearize the backbone plasmid, and Gibson in vitro recombination method can be used to splice the exogenous gene expression cassette with the backbone plasmid to form the recombinant plasmid, which is used for the packaging of human adenovirus type 4 vectored recombinant virus.

Figure 7:
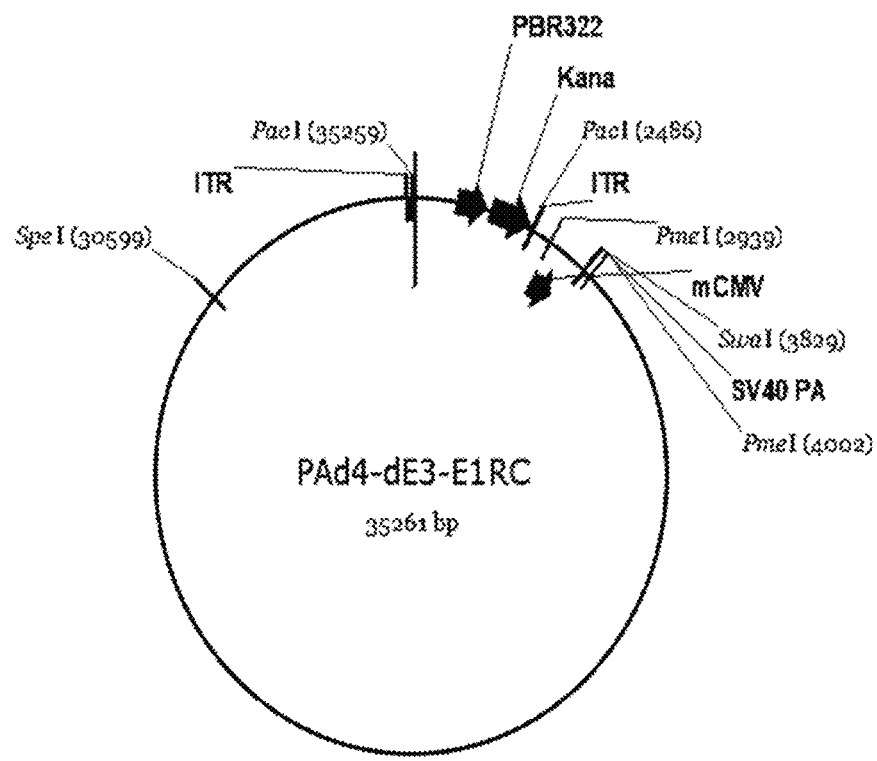

FIG. 7 depicts the schematic diagram of human adenovirus type 4 backbone plasmid PAd4-dE3-E1RC. SwaI is used to linearize the backbone plasmid, and Gibson in vitro recombination method can be used to splice the exogenous gene with the backbone plasmid to form the recombinant plasmid, which is used for the packaging of human adenovirus type 4 vectored recombinant virus. In the recombinant virus, the expression of exogenous gene is initiated by mCMV promoter.

Figure 8:
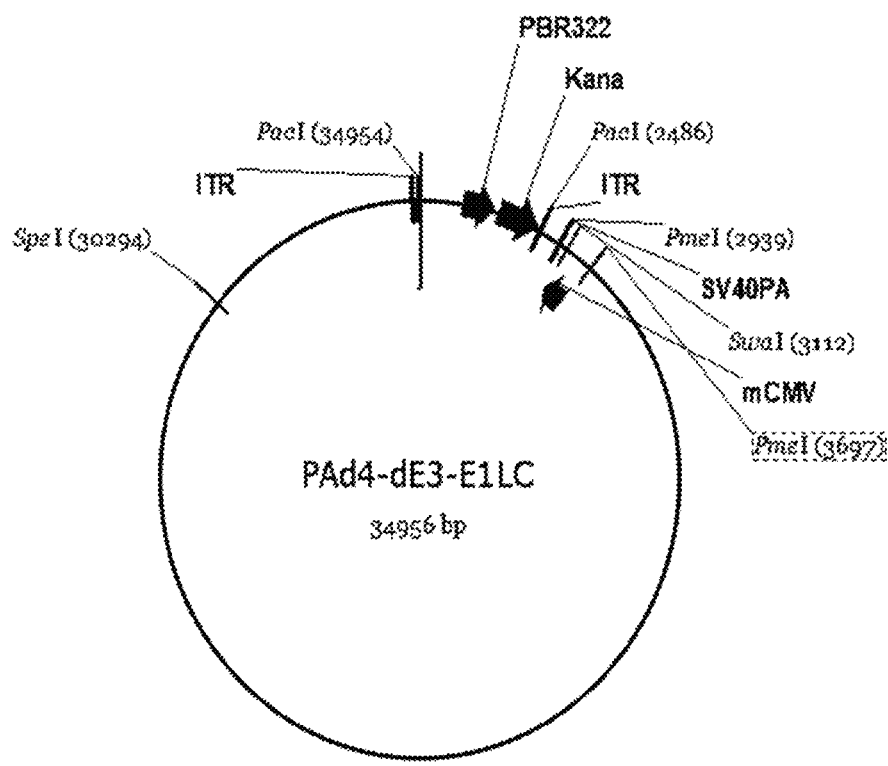

FIG. 8 is the schematic diagram of human adenovirus type 4 backbone plasmid PAd4-dE3-E1LC. SwaI is used to linearize the backbone plasmid, and Gibson in vitro recombination method can be used to splice the exogenous gene with the backbone plasmid to form the recombinant plasmid, which is used for the packaging of human adenovirus type 4-vectored recombinant virus. In the recombinant virus, the expression of exogenous gene is initiated by mCMV promoter.

FIG. 9 provides the packaging of human adenovirus type 4 recombinant virus and verification thereof. The above-mentioned recombinant plasmid constructed by the human adenovirus type 4 vector system is linearized by PacI, then transfected into HEK293 cells. Significant cytopathic changes could be observed after culturing for 3-5 days. It has been verified that the exogenous gene (firefly luciferase gene in the case) can be stably expressed, and the structure of the recombinant virus is normal when observed through transmission electron microscopy.

Figure 10A:
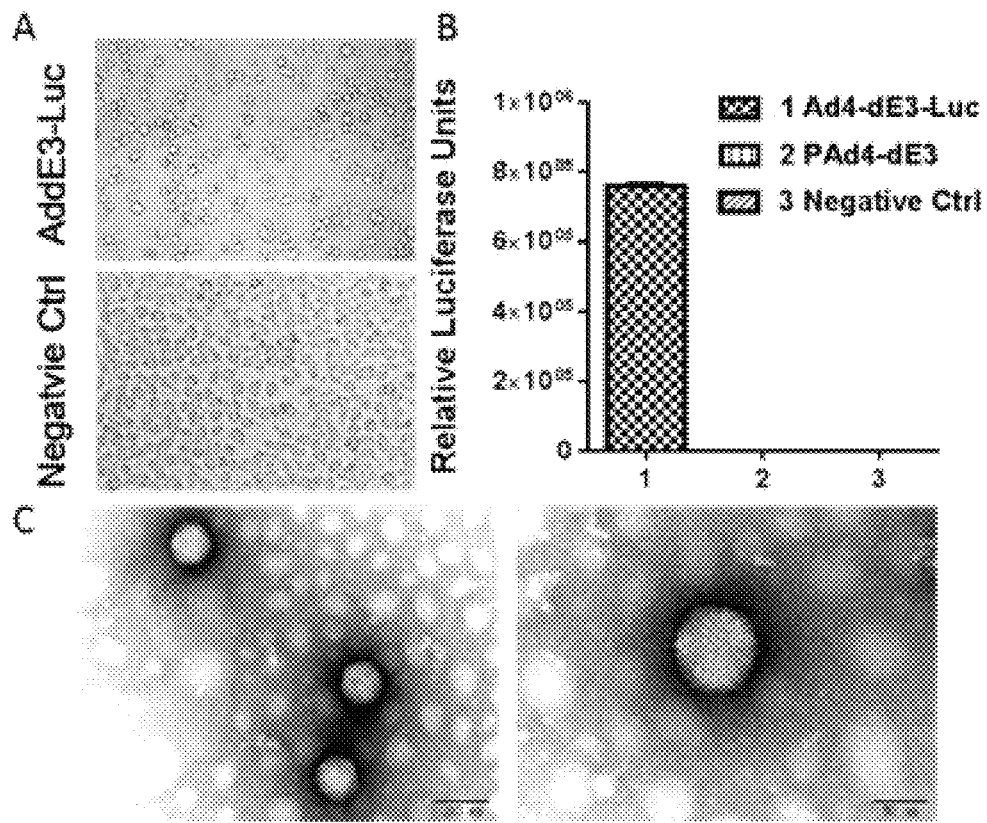
Figure 10B:
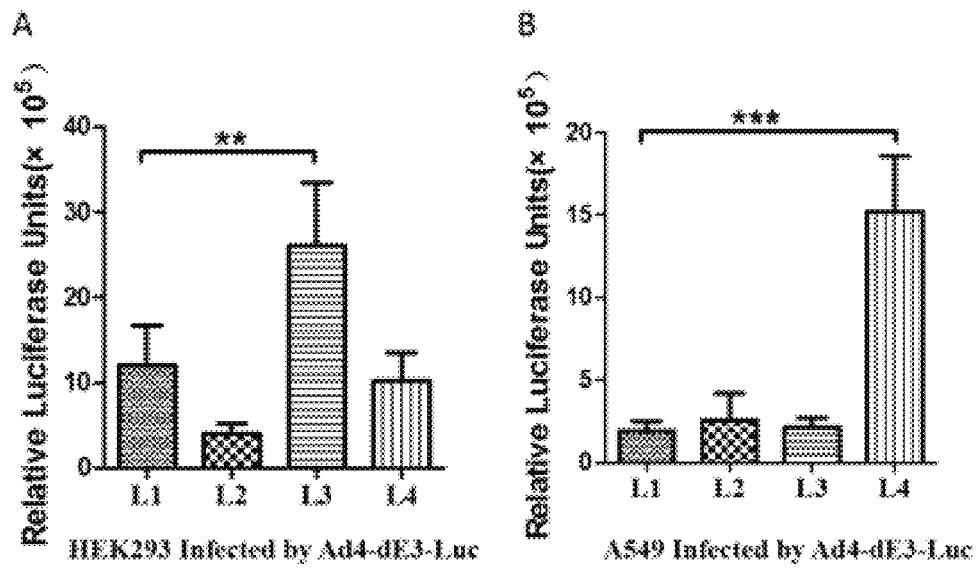

FIG. 10 depicts the expression of exogenous gene in HEK293 and A549 cells infected with human adenovirus type 4 recombinant luciferase virus with different insertion mode. Four kinds of recombinant viruses respectively infect HEK293 and A549 cells at a multiplicity of infection of 1. After 24 hours of infection, the supernatant is removed, the cells are lysed, and the luciferase expression level in the lysate is detected. Results show that the recombinant virus with the luciferase expression cassette inserted in forward orientation in E1 region (L3) and in reverse orientation in E1 region (L4) in HEK293 and A549 cells have significantly higher expression levels than those inserted in forward and reverse orientations in E3 region (L1 and L2), respectively.

Figure 11A:
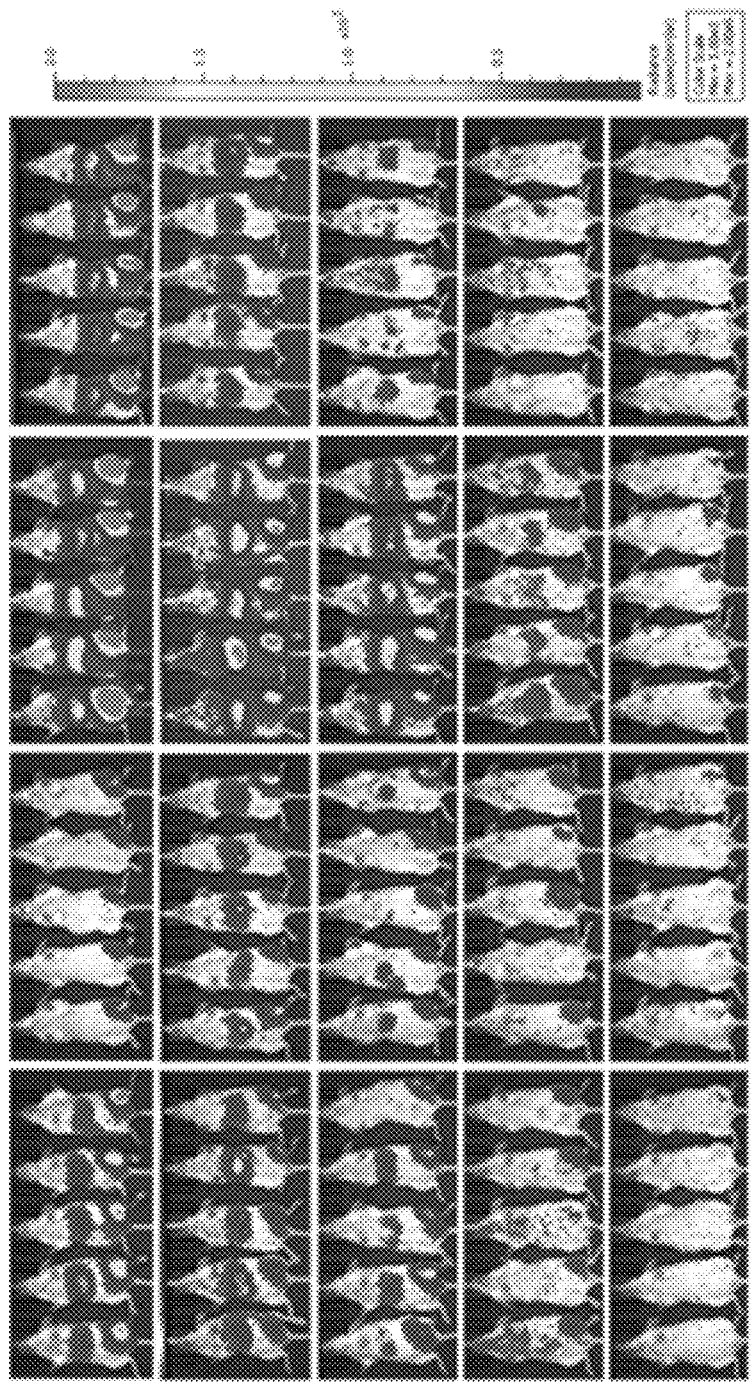
Figure 11B:
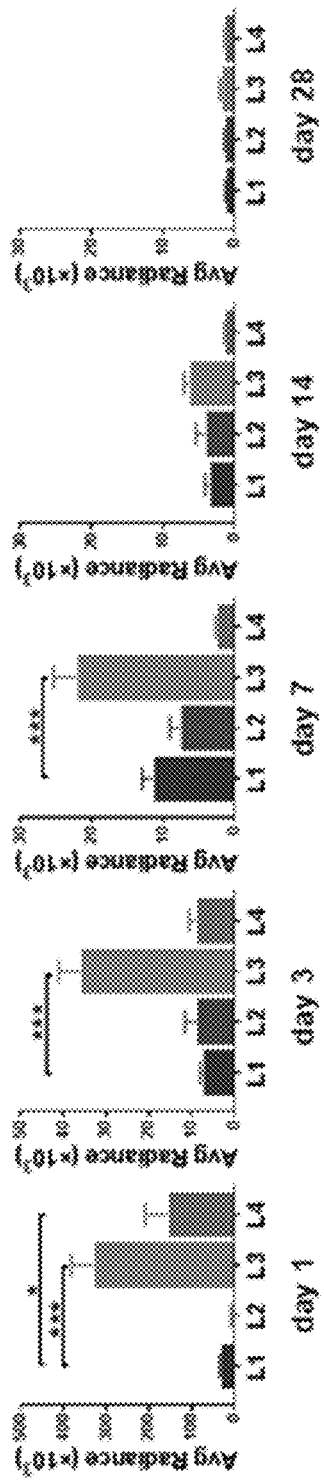

FIG. 11 shows the expression of exogenous gene after the infection of BALB/c mice with human adenovirus type 4 recombinant luciferase virus with different insertion mode. 4 kinds of human adenovirus type 4 vector recombinant luciferase viruses with different insertion mode are used to infect BALB/c mice at a dose of $10^7$ IFU per animal. The luciferase expression levels after 1, 3, 7, 14, and 28 days of administration (A) is observed by in vivo imaging, and the differences of mean fluorescence intensity across groups at each time point are compared (B). Results show that after infected with recombinant virus having luciferase expression cassette inserted in forward orientation in E1 region (L3) and in reverse orientation in E1 region (L4), the fluorescence detection intensity is significantly higher than those infected with a virus having expression cassette inserted in forward and reverse orientations in E3 region (L1 and L2), respectively.

DETAILED DESCRIPTION OF THE INVENTION

Beneficial Effects of the Present Invention

The present inventor uses PCR to amplify firefly luciferase as the exogenous target gene. The amplified sequence is assembled with the human adenovirus type 4 vector into a recombinant plasmid carrying the exogenous target gene. The recombinant plasmid is digested by PacI and then transfected into HEK293 cells. Significant cytopathic changes could be observed after culturing for 3-5 days. The recombinant virus with stable virulence is obtained through continuous passage (see Example 3 and FIG. 9). There are certain differences between the recombinant viruses packaged by different forms of vector plasmids. Vector plasmid PAd4-dE3-E1 provides users with the opportunity to change the promoter freely, as the promoter significantly affects the expression level of exogenous gene in different types of cells. Vector plasmid PAd4-dE3-E1RC or vector plasmid PAd4-dE3-E1LC contains a promoter that controls the expression of exogenous gene, but the ability to express exogenous gene is slightly different due to different direction of the control sequence (see examples 4-5 and FIGS. 10-11).

Finally, the present invention provides the application of the above-mentioned single-plasmid vector system in the preparation of vaccines and medicines.

The present invention discloses the application of a recombinant virus carrying the firefly luciferase reporter gene prepared by a replication-competent human adenovirus type 4 vector single-plasmid system in the epidemiological studies of the human adenovirus type 4. The amount of recombinant human adenovirus type 4 containing the reporter gene is positively correlated with the expression level of the reporter gene within a certain range. If human serum contains human adenovirus type 4 neutralizing antibody, the recombinant virus is neutralized by the antibody after being incubated with the recombinant human adenovirus type 4 containing the reporter gene, then the logarithm value of the expression level of exogenous gene and the concentration of neutralizing antibody presents an S-shaped distribution. The level of neutralizing antibody in the sample can be calculated by curve fitting.

Therefore, the human adenovirus type 4 vector single-plasmid system and the method for packaging recombinant adenovirus type 4 provided by the present invention can be used in the preparation of human adenovirus type 4 neutralizing antibody detection kit, and the method or kit may be used for the seroepidemiological monitoring of human adenovirus type 4, evaluation of humoral immune response to human adenovirus type 4 vaccine, and investigation on pre-existing immunity level of human adenovirus type 4 vectored recombinant vaccine.

Then, the replication-competent human adenovirus type 4 vector single-plasmid system provided by the present invention or the recombinant adenovirus carrying the exogenous target gene prepared by the vector system can also be applied to the preparation of recombinant vaccines, gene therapy kits or oncolytic virus drugs. Based on the recombinant adenovirus system of the present invention, as well as relevant technical means in the field, the corresponding recombinant human adenovirus type 4 can be prepared for gene therapy or recombinant vaccine studies.

The recombinant human adenovirus type 4 vectored vaccine prepared by the replication-competent human adenovirus type 4 vector single-plasmid system which is provided by the present invention is a replication-competent adenovirus-vectored vaccine, whose genome carrying the corresponding antigen of the target pathogen. After humans or other mammals are immunized with this type of vaccine, the adenovirus infects the recipient animals and expresses the corresponding antigen in the animal cells, and stimulates the body to produce specific antibodies against the antigen and the immune effect is achieved. Preferably the recombinant vaccine is an oral vaccine.

In the application in gene therapy kits, exogenous genes with therapeutic effect can be inserted into the human adenovirus type 4 vector system provided by the present invention. The recombinant virus is used as a tool to deliver the exogenous gene, which can be efficiently delivered to the body, highly expressing the therapeutic proteins in corresponding parts.

In the application in preparation of anti-tumor drugs, the present invention can provide the human replication-competent human adenovirus type 4 vector-based oncolytic virus. Since the virus can replicate and multiply, the modified recombinant virus can be injected into the tumor to kill malignant tumors with the help of the virus's ability to multiply and lyse cells, or of the virus's secretion of anti-tumor proteins. For example, the insertion of tumor suppressor gene p53 into a recombinant virus can be used for anti-tumor treatment.

The present application selects a human adenovirus type 4, which has been used as a live virus vaccine for a long time, as the template to construct a vector system that can be used to package recombinant human adenovirus type 4.

The human adenovirus type 4 vector system constructed in the study is a replication-competent adenovirus vector system. In the conventional adenovirus type 5 vector system, E1 and E3 regions of adenovirus are deleted. The deletion of E1 region makes the virus loses its ability to replicate. In preparation, the 293 cell having supplementary E1 region gene of adenovirus type 5 is generally used for expanded culture. The study uses different construction strategies to prepare the replication-competent recombinant human adenovirus type 4 vector system. Given that the upper limit of the adenovirus packaging capacity is about 5%-10% of the whole genome, which means the maximum insertion of exogenous fragments into the whole genome of adenovirus can only be about 2000 bp in length, accordingly the E3 region of adenovirus is knocked out to expand the upper limit of the virus vector packaging capacity to over 6000 bp. Considering the good safety and tolerability of human adenovirus type 4 live virus vaccine since its first use in the United States in 1970s, the E1 region of adenovirus is retained to preserve its ability to replicate, so as to enhance the expression of exogenous gene by the recombinant virus.

The backbone design of the human adenovirus type 4 vector system constructed in this application is significantly different from that of other human adenovirus type 4 vectors. There have already been international studies on replication-competent human adenovirus type 4 vectors, but still in the early stage. Different from the human adenovirus type 4 vector system constructed in this application, the existing replication-competent human adenovirus type 4 vectors only have E3 region partially deleted, and the antigen expression cassette is inserted at the E3-deleted site. In this application, adenovirus E3 region is completely deleted, and the exogenous gene is inserted between the packaging signal of the adenovirus genome and E1 region (E1 upstream sequence). It is verified at the cellular and animal levels that the inserted antigen expression cassette in the upstream sequence of E1 could significantly increase the virus vector expressing the exogenous gene.

Furthermore, the human adenovirus type 4 vector system constructed in this application is a single-plasmid vector system. Generally, the construction of adenovirus type 5 vector systems is the most referenced method for adenovirus vector construction, mainly including Adeasy and Admax systems, both of which are double-plasmid recombinant virus packaging systems. In the Adeasy system, the antigen is first inserted into the shuttle plasmid. Both sides of the site for antigen insertion in the shuttle plasmid contain homology arms for recombined with the backbone plasmid. The recombinant plasmid used to package the virus can be screened by the homologous recombination of the shuttle plasmid and the backbone plasmid in BJ5183 bacterium. The recombinant plasmid is linearized and introduced into the 293 cell to package the recombinant virus. In the system, the efficiency of virus packaging is high; however, the acquisition of recombinant plasmids depends on the homologous recombination screening in bacterium, which may lead to non-specific recombination. In the Admax system, the antigen is firstly inserted into the small intermediate plasmid. Two sides of the site for antigen insertion in the intermediate plasmid are upstream terminal of E1 region and downstream gene of E1 region of adenovirus type 5, respectively, with Loxp recombination sites on the lateral side. After the intermediate plasmid and virus backbone plasmid are introduced into the 293 cell, site-specific recombination is used to complete the splicing of the terminal fragment containing antigen gene with the genome backbone, and the recombinant virus is packaged at the same time. In the system, there is no need to obtain the additional full-length recombinant plasmid containing the target gene, and the recombination of the backbone and fragments as well as virus packaging are completed in one step, but the efficiency of virus packaging is low. The human adenovirus type 4 vector system constructed in this application only contains a backbone plasmid, and the exogenous gene is directly inserted into the site for exogenous gene insertion in the E1 upstream of the backbone plasmid through one-step recombination in vitro, and a full-length recombinant plasmid for packaging is obtained. The homologous recombination in bacteria or cells is not required in this process, and the occurrence of non-specific recombination is avoided, accordingly having significant application advantages such as fast speed, high efficiency, low cost, and capability of batch preparation.

In summary, the vector system in this application is a single-plasmid vector system for packaging replication-competent human adenovirus type 4 vectored recombinant virus. In the system, adenovirus E3 region is completely deleted and exogenous gene is inserted between E1 region upstream and packaging signal. Replication-competent human adenovirus type 4 vectored recombinant virus can be in batch preparation with fast speed, high efficiency, and low cost by the vector system. The recombinant virus packaged by the system can be used for the epidemiological monitoring of human adenovirus type 4, evaluation of human adenovirus type 4 vaccine, and the development of human adenovirus type 4 vector recombinant vaccine or recombinant drugs.

EXAMPLES

The present invention is further described with specific examples below, and the advantages and features of the present invention will become clearer with the description. However, these examples are only exemplary, and do not constitute any limitations on the scope of the claim of the present invention.

Unless otherwise specified, the initial plasmids, enzymes, and related reagents used in the following examples are commercially available products which can be purchased from companies, and the primers used are synthesized by synthetic companies.

Example 1

Construction of a Backbone Plasmid (PAd4-dE3-E1) Capable of Inserting an Antigen Expression Cassette in E1 Region 1. Construction of Human Adenovirus Type 4 Terminal Recombinant Plasmid (Ad4-re)

Figure 2:
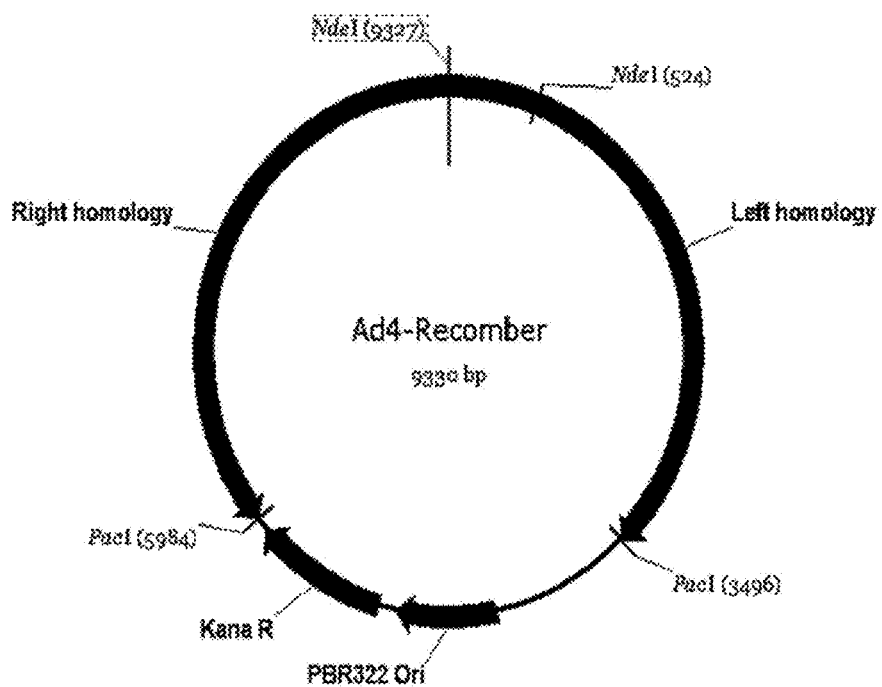
FIG. 2 provides the schematic diagram of human adenovirus type 4 terminal recombinant plasmid. The vector region containing kanamycin resistance gene (Kana R) and PBR322 replication origin (pBR322 Ori) is amplified according to the template of Plasmid pET28a. The DNA sequences of about 3000 bp at both ends of genome as the left homology arm and the right homology arm are amplified according to the template of Ad4 genome, respectively. The above three fragments are spliced successively, using restriction enzyme PacI connecting the vector region and the terminal sequences of the two homology arms, and restriction enzyme NdeI connecting the two homology arms.

The plasmid is used for homologous recombination with the adenovirus genome to prepare the adenovirus backbone plasmid, and the construction method is described as follows: homology arms are amplified from both ends of the Ad4-RI67 virus strain genome. The amplimer pair of left terminal homology arm is Ad4-left-F: GGAACAT-AATGGTGCTTAATTAACTATCTATATAATATACC (SEQ ID NO: 4) and Ad4-Left(3500)-R: CATATGGTCAGA-TAAGGGCTGAAT (SEQ ID NO: 5), and the amplified sequence is about 3500 bp in length. The amplimer pair of right terminal homology arm is Ad4-Right(3300)-F: TTATCTGACCATATGACTCCATACACCAATGCTG (SEQ ID NO: 6) and Ad4-right-R: GCGCACATTAAT-TAACTATCTATATAATATACC (SEQ ID NO: 7), and the amplified sequence is about 3300 bp in length. The vector region containing PBR322 replication origin and kanamycin resistance gene is amplified from vector plasmid pET28a. The amplimer pair is pET28a-F: TTAATTAAGCACCAT-TATGTTCCGGATCTG (SEQ ID NO: 8) and pET28a-R: TTAATTAATGTGCGCGGAACCCCTATT (SEQ ID NO: 9), and the amplified sequence is about 2500 bp in length. The above amplified fragments are recovered, and then spliced by Gibson recombination system (NEB), with the specific method as follows: 50 ng purified vector fragment, about 100 ng multiple purified fragments for integration (the molar ratio to the vector is controlled to be 2:1), and 10 μl of Gibson Mix assembly solution are mixed to 20 μl with sterile water. The mixture is incubated at 50° C. for 15 minutes and placed into an ice bath for 3 minutes. 2 μl is taken as recombinant system and transformed into 50 μl TOP10 competent cells, then the transformed cells are incubated for 40-60 minutes, coated on the plate, and cultured overnight. After spliced NdeI restriction enzyme site is introduced into the position where the homology arms intersect, and PacI restriction enzyme site is introduced into the location where the homology arm intersects with the vector region, finally the human adenovirus type 4 terminal recombinant plasmid PAd4-recomber (Ad4-re) is obtained. The plasmid map is shown in FIG. 2.

Figure 1:
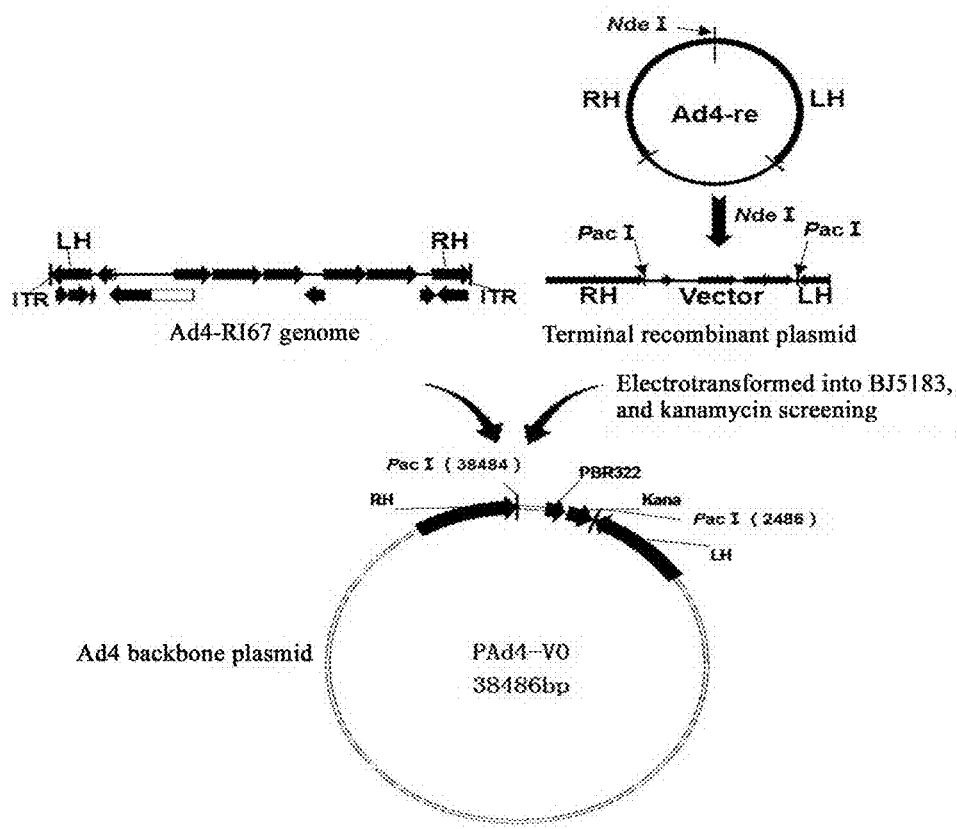
FIG. 1 is the flow chart of the construction of human adenovirus type 4 backbone plasmids. The human adenovirus type 4 terminal recombinant plasmid (Ad4-re) is linearized by NdeI, then electrotransformed with human adenovirus type 4 genome into BJ5183 electroporation-competent cells. The left homology arm (LH) of the linearized terminal recombinant plasmid is homologously recombined with the left terminal sequence of the adenovirus genome. Similarly, the right homology arm (RH) is homologously recombined with the right terminal sequence of the adenovirus genome. After recombination, the two linear fragments are combined into a closed circular plasmid. The successful homologous recombined closed circular adenovirus backbone plasmid, named PAd4-V0, is screened by kanamycin.

2. Preparation of Adenovirus Backbone Plasmid (PAd4-V0) by Homologous Recombination The plasmid is an adenovirus backbone plasmid containing the entire genome of human adenovirus type 4 (HAdV-4), and the construction method is described as follows: the HAdV-4 terminal recombinant plasmid is linearized by NdeI, then electrotransformed with the HAdV-4 virus genome into BJ5183 electroporation-competent cells, with the electroporation conditions of 2.5 KV, 25 μF, 200Ω, and 2 mm. The linearized HAdV-4 terminal recombinant plasmid contains kanamycin resistance gene. The end of the said linearized fragment is recombined with the end of the virus genome to form a closed circular adenovirus backbone plasmid. Kanamycin antibiotic is used to screen the target transformant PAd4-V0 that meets the requirements. The schematic diagram of plasmid structure and the construction flow chart are shown in FIG. 1.

3. Preparation of E3 Homologous Recombinant Plasmid (PAd4-dE3-Re)

The plasmid is used for homologous recombination with the adenovirus backbone plasmid to get an E3 region-completely-deleted adenovirus genome. The construction method is as follows: homology arms are amplified from upstream and downstream adjacent regions at both sides of E3 region of Ad4-RI67 genome, respectively. Ampicillin resistance gene is amplified from plasmid pMD-18T, and the vector fragment is amplified from pET28a plasmid. The amplimer pair of the upstream homology arm of E3 region is Ad4-de E3-up-F: GCGCACATTAATTAATGCACTA-CATCTTCAGGCACGG (SEQ ID NO: 10) and Ad4-de E3-up-R: ACTAGTTGTCGAAGCCGAGCTAGGTCAG (SEQ ID NO: 11). The amplimer pair of the downstream homology arm of E3 region is Ad4-de E3-down-F: ACT-AGTTCAAGACCCTATGCGGCCT (SEQ ID NO: 12) and Ad4-de E3-down-R: CGTGACTTTAATTAACG-GAAACAGCTCCATCATG (SEQ ID NO: 13). The amplimer pair of ampicillin resistance gene is Ad4-de E3-AMP-F: GCTTCGACAACTAGTGGATCTTCACCTA-GATCC (SEQ ID NO: 14) and Ad4-de E3-AMP-R: GGGTCTTGAACTAGTGGAAATGTGCGCGGAAC (SEQ ID NO: 15). The amplimer pair of the vector fragment is Ad4-de E3-V-F: TTAATTAAAGTCACGTAGCGA- TAGCGGA (SEQ ID NO: 16) and Ad4-de E3-V-R: TTAAT-TAATGTGCGCGGAACCCCTATT (SEQ ID NO: 17). Gibson in vitro one-step recombination method is used to splice the above four fragments successively (see Example 1-1 for details). SpeI restriction enzyme site is introduced in the position where the homology arm intersects with the ampicillin resistance gene, and PacI restriction enzyme site is introduced in the location where the homology arm intersects the vector region. The schematic diagram of recombinant plasmid structure is shown in FIG. 3.

4. Preparation of E3-Completely-Deleted Human Adenovirus Type 4 Backbone Plasmid (PAd4-dE3)

The construction method is as follows: BJ5183 bacterium is transformed with adenovirus backbone plasmid PAd4-V0, then transformed into competent bacterium. The E3 homologous recombinant plasmid PAd4-dE3-Re is linearized by PacI, then the linearized fragment is transformed into the competent bacterium containing the adenovirus backbone plasmid PAd4-V0. The linearized E3 homologous recombinant plasmid contains ampicillin resistance gene. After homologous recombination of the end of the fragment with both ends of E3 region of the virus genome, E3 region of the adenovirus backbone plasmid is replaced by ampicillin resistance gene, and the recombinant transformant obtains ampicillin resistance. Ampicillin antibiotic is used to screen the target transformant PAd4-dE3-AMP which meets the requirements. SpeI restriction enzyme is used to delete the ampicillin resistance gene in PAd4-dE3-AMP. After the digested fragments are recovered, the fragments are self-ligated by the addition of T4 DNA ligase and transformed into TOP 10 competent bacterium. Kanamycin is used to screen the positive clone PAd4-dE3. The schematic diagram of recombinant plasmid structure and the construction flow chart are shown in FIG. 4.

5. Construction of the Backbone Plasmid (PAd4-dE3-E1) Capable of Insertion of an Antigen Expression Cassette in E1 Region PmeI monoclonal site is introduced in the upstream of E1 region of the E3-deleted human adenovirus type 4 backbone plasmid, and the construction method is as follows: after the adenovirus backbone plasmid PAd4-dE3 is digested with PmeI and NdeI, overlapping PCR is used to amplify the complementary fragments. During the preparation of complementary fragments, base A at 2692 bp (corresponding to 204 bp of Ad4-RI67 genome, reference sequence GenBank No. AY594253) of PAd4-dE3 plasmid is mutated to base G to delete the original PmeI site. Base AAAC is added at 2939 bp-2940 bp (corresponding to the 397 bp-471 bp of Ad4-RI67, reference sequence GenBank No. AY594253) of the spare sequence between the packaging signal and EI region to introduce PmeI restriction enzyme site. The sequence prior to mutant E1 site is shown in SEQ ID NO.1, and gtttaaac is the introduced sequence of PmeI restriction enzyme site at 447-454 bp. Overlapping PCR needs the following two primer pairs: the primer pair used to amplify the upstream fragment is Ad4-E1-dPme1-1F: AACGAGGTGTGGTTTG (SEQ ID NO: 18) and Ad4-E1-dPme1-1R: CAGCTGACACCTACGTAAGTT-TAAACACCGGACTTTGACACCG (SEQ ID NO: 19); the primer pair for downstream fragment is Ad4-E1-dPme1-2F: CGGTGTCAAAGTCCGGTGTTTAAACT-TACGTAGGTGTCAGCTG (SEQ ID NO: 20) and Ad4-GP-E1-dPme1-2R: ACGGCGGCCAGCATATGACTG (SEQ ID NO: 21). Gibson in vitro one-step recombination method is used to splice the PCR-amplified complementary fragment with the double-digested backbone plasmid PAd4-dE3, then the spliced product is transformed into TOP10 competent cells. Kanamycin is used to screen the positive clone PAd4-dE3-E1. The mutation at E1 of the recombinant plasmid is shown in FIG. 5, and the schematic diagram of the recombinant plasmid structure is shown in FIG. 6. Appropriate target gene expression cassette fragment is amplified by PCR, and homology region of 15 bp is added to the ends of forward and reverse primers (sequence of the homology region at the end of the forward primer (5'→3') is CAAAGTCCGGTGTTT (SEQ ID NO: 22), and that at the end of the reverse primer (5'→3') is CACC-TACGTAAGTTT (SEQ ID NO: 23). Gibson in vitro recombination (refer to Example 1-1 for details, with difference in the addition amount of vector fragment, which is adjusted from 50 ng to about 400 ng) is used for directly splicing the PCR product with linearized PAd4-dE3-E1 plasmid by PmeI to prepare the human adenovirus type 4 vectored recombinant plasmid for packaging recombinant virus.

Example 2

Preparation of Single-Plasmid Vector Systems PAd4-dE3-E1RC and PAd4-dE3-E1LC for Packaging Recombinant Human Adenovirus Type 4

The E3-completely-deleted human adenovirus type 4 backbone plasmid (PAd4-dE3) is obtained based on steps 1-4 of Example 1, and mCMV promoter and SV40 PolyA sequence are amplified from vector plasmid PDC316 as the control sequence for the expression of exogenous gene in the adenovirus vector. SwaI is introduced between the promoter and the polyadenylic acid tail as a monoclonal site of the adenovirus vector. Gibson in vitro one-step recombination method is used to insert the control sequence into the PmeI site of the PAd4-dE3-E1 plasmid in forward orientation (promoter at upstream) and in reverse orientation (promoter at downstream), to obtain the recombinant plasmids PAd4-dE3-E1RC (FIG. 7) and PAd4-dE3-E1LC (FIG. 8). The primer pair for the insertion of control sequence in forward orientation is Ad4-E1R-F: CAAAGTCCGGTGTT-TAAACGTTCCGGGTCAAAGTTGG (SEQ ID NO: 24) and Ad4-E1R-R: CACCTACGTAAGTTTAAACTG-GATCTTCGATGCTAGACG (SEQ ID NO: 25). The primer pair for the insertion of control sequence in reverse orientation is Ad4-E1L-F: CAAAGTCCGGTGTTTAAACTG-GATCTTCGATGCTAGACG (SEQ ID NO: 26) and Ad4-E1L-R: CACCTACGTAAGTTTAAACGTTCCGGGT-CAAAGTTGG (SEQ ID NO: 27). Appropriate target gene fragment is amplified by PCR, and homology region of 15 bp is added to the ends of forward and reverse primers (sequence of the homology region at the end of upstream primer (5'→3') is TGAGCTCGTCGATTT (SEQ ID NO: 28), and that at the end of downstream primer (5'→3') is GCTCGAAGTCGATTT (SEQ ID NO: 29). Gibson in vitro recombination (refer to Example 1-1 for details, with difference in the addition amount of vector fragment, which is adjusted from 50 ng to about 400 ng) is used for splicing the PCR product with SwaI-linearized PAd4-dE3-E1RC or PAd4-dE3-E1LC plasmid, to prepare the human adenovirus type 4 vectored recombinant plasmid for packaging recombinant virus. The sequence between PmeI restriction enzyme sites in PAd4-dE3-E1RC plasmid is shown in SEQ ID NO.2, wherein the sequences at 1-8 and 759-766 bp are the introduced sequence of PmeI restriction enzyme cutting sites, gtttaaac, and that at 586-593 are the introduced sequence of SwaI restriction enzyme cutting site, atttaaat. The sequence between the PmeI restriction enzyme sites in PAd4-dE3-E1LC plasmid is shown in SEQ ID NO.3, wherein the sequences at 1-8 and 759-766 bp are the introduced sequence of PmeI restriction enzyme sites sequences, gtttaaac, and that at 174-181 is the introduced sequence of SwaI restriction enzyme site, atttaaat.

Example 3

Packaging of Human Adenovirus Type 4 Vectored Recombinant Firefly Luciferase Virus Based on the method shown in Example 1 or Example 2, after construction of human adenovirus type 4 vectored recombinant firefly luciferase plasmid, restriction enzyme PacI is used to linearize human adenovirus type 4 vectored recombinant plasmid, and HEK293 cell is selected as the packaging cell line. Turbofect transfection reagent is used to transfect the linearized fragments into HEK293 cells. Then the cells is cultured for 3-5 days until the occurrence of cytopathic changes. The main manifestations of cytopathy include cell rounding, increased permeability, and large-scale cell drift in severe cases (FIG. 9A). After freezing and thawing the cytopathic cell culture fluid, stably passaged recombinant virus can be obtained through continuous passage until persistent cytopathic changes. When the packaging of human adenovirus type 4 vectored recombinant firefly luciferase virus is completed, the recombinant virus is used to infect HEK293 cells, the continuous expression of luciferase (FIG. 9B) is observed. The structure of the recombinant virus particles is detected by electron microscopy, which is 80-90 nm in size, with typical spherical structure, consistent with the expected results (FIG. 9C), suggesting that the system can obtain human adenovirus type 4 vectored recombinant virus with normal structure and stable expression of exogenous gene.

Example 4

The Expression Level of Exogenous Gene of the Recombinant Virus with Antigen Expression Cassette Inserted in E1 Region in Cells is Significantly Higher than that of the Recombinant Virus with Antigen Expression Cassette Inserted in E3 Region The firefly luciferase antigen expression cassettes are inserted in forward or reverse orientations respectively in the E3-deleted site or the upstream site of E1, to prepare 4 kinds of human adenovirus type 4 vectored recombinant firefly luciferase viruses with different insertion modes. Four kinds of recombinant viruses respectively infect HEK293 and A549 cells at a multiplicity of infection of 1. After 24 hours of infection, the supernatant is removed, and the level of luciferase activity in the cell lysate is detected, with results shown in FIG. 10. The recombinant viruses inserted in forward and reverse orientations in E3 region are marked as L1 and L2, respectively, and those inserted in forward and reverse orientations in E1 region upstream are marked as L3 and L4, respectively. Different insertion ways of exogenous gene expression cassette will affect the luciferase expression of recombinant virus. In HEK293 cells, recombinant virus L3 (gene expression cassette inserted in forward orientation in E1 region upstream) has the highest luciferase expression level (t test, P<0.01); in A549 cells, recombinant virus L4 (gene expression cassette inserted in reverse orientation in E1 region upstream) has the highest luciferase expression level (t test, P<0.001).

Example 5

The Expression Level of Exogenous Gene in Mice Infected with the Recombinant Virus with Antigen Expression Cassette Inserted in E1 Region is Significantly Higher than that of the Recombinant Virus with Antigen Expression Cassette Inserted in E3 Region In the test of intracellular expression level, the expression level of the recombinant virus with insertion in E1 upstream is higher, but the expression is inconsistent in different cell lines. To further explore the differences in exogenous gene expression in normal bodies infected with recombinant viruses with different insertion modes, 4 kinds of recombinant luciferase viruses with different insertion modes are used to infect BALB/c mice at a dose of $10^7$ IFU per animal through intramuscular injection of unilateral hind limb. In vivo imaging is performed after 1, 3, 7, 14, and 28 days of administration (after infection with the recombinant virus, luciferase in the virus genome is expressed in the host cell. The firefly luciferase substrate is injected into the abdominal cavity of mice, which produces luminescent substances under the action of luciferase, and the fluorescence signal from tissues or organs expressing a large amount of luciferase can be captured by the camera of in vivo imager) to investigate distribution and infection level in the body of the recombinant virus after immunization, and the results is shown in FIG. 11. One day after the administration, the expression level of the recombinant virus is the strongest, with significant differences in the expression of recombinant viruses with different insertion method modes. After being infected with the recombinant viruses L3 (gene expression cassette inserted in forward orientation in E1 upstream) and L4 (gene expression cassette inserted in reverse orientation in E1 upstream), the mice show significantly higher luciferase activity than those infected with L1 (gene expression cassette inserted in forward orientation in E3 region) and L2 (gene expression cassette inserted in reverse orientation in E3 region).

INDUSTRIAL APPLICABILITY

The present invention discloses a single plasmid vector system for packaging recombinant human adenovirus type 4. The vector system can be used for rapidly and efficiently preparing a human adenovirus type 4 vector recombinant virus for stably expressing an exogenous gene, and has a good application prospect in the fields of preparation of a diagnostic kit, a vaccine, a gene therapy kit and/or a tumor therapy drug, showing the industrial applicability.

The invention claimed is:

1. A single-plasmid vector system for packaging recombinant human adenovirus type 4, wherein the vector system contains
 an E3-deleted human adenovirus type 4 genome comprising a packaging signal and an E1 region,
 a pBR322 replication origin,
 a kanamycin resistance gene, and
 a nucleotide sequence consisting of SEQ ID NO: 1 which comprises a site for insertion of an exogenous gene, and said SEQ ID NO:1 is located after the packaging signal and prior to the E1 region,
wherein a PmeI restriction enzyme site is located at 447-454 bp of SEQ ID NO: 1 for insertion of an exogenous gene.

2. The single-plasmid vector system of claim 1, wherein the site for exogenous gene insertion in the vector system does not contain expression control elements, and a DNA fragment carrying the exogenous gene is directly cloned into the restriction enzyme site PmeI in the vector system.

3. The single-plasmid vector system of claim 1, wherein a control element is inserted in forward orientation into the site for exogenous gene insertion in the vector system, the control element is a DNA fragment containing an mCMV promoter and an SV40 polyadenylic acid tail termination sequence, wherein both ends of the control element are PmeI sites, the control element comprises a Swa restriction enzyme site for exogenous gene cloning, and a DNA fragment of the exogenous gene is directly cloned into the SwaI restriction enzyme site in the vector system.

4. The single-plasmid vector system of claim 1, wherein a control element is inserted in reverse orientation into the site for exogenous gene insertion in the vector system, the control element is a DNA fragment containing an mCMV promoter and an SV40 polyadenylic acid tail termination sequence, wherein both ends of the control element are PmeI sites, the control element comprises a Swa restriction enzyme site for exogenous gene cloning, and a DNA fragment of the exogenous gene is directly cloned into the SwaI restriction enzyme site in the vector system.

5. A method for packaging recombinant human adenovirus type 4 using the single-plasmid vector system of claim 1, wherein the said method comprises the following steps:
 (1) Linearizing the human adenovirus type 4 vector recombinant plasmid by restriction enzyme PacI;
 (2) Transfecting the linearized fragment into HEK293 cells, then culturing the transfected cells until the occurrence of cytopathic changes;
 (3) Freezing and thawing the cytopathic cell culture fluid, then continuously passage culturing until persistent cytopathic changes; and
 (4) Harvesting stably passaged recombinant human adenovirus type 4.

6. A vaccine comprising the single-plasmid vector system of claim 1.

7. A kit for diagnostics or gene therapy, comprising the single-plasmid vector system of claim 1.

8. A composition comprising the single-plasmid vector system of claim 1.

* * * * *